US007111141B2

(12) United States Patent
Nelson

(10) Patent No.: US 7,111,141 B2
(45) Date of Patent: Sep. 19, 2006

(54) DYNAMIC NV-RAM

(75) Inventor: Dwayne R. Nelson, Las Vegas, NV (US)

(73) Assignee: IGT, Reno, NV (US)

( * ) Notice: Subject to any disclaimer, the term of this patent is extended or adjusted under 35 U.S.C. 154(b) by 172 days.

(21) Appl. No.: 10/243,104

(22) Filed: Sep. 13, 2002

(65) Prior Publication Data

US 2003/0073497 A1   Apr. 17, 2003

Related U.S. Application Data

(63) Continuation-in-part of application No. 09/690,931, filed on Oct. 17, 2000, now Pat. No. 6,804,763.

(51) Int. Cl.
  *G06F 12/00* (2006.01)
(52) U.S. Cl. .................... 711/170; 711/165; 463/24; 463/25; 463/29
(58) Field of Classification Search ............... 711/165, 711/170, 102, 103; 463/24, 25, 29, 36, 42, 463/43
See application file for complete search history.

(56) References Cited

U.S. PATENT DOCUMENTS

| 3,931,504 A | 1/1976 | Jacoby ..................... 726/23 |
| 4,430,728 A | 2/1984 | Beitel et al. ............. 379/93.02 |
| 4,454,594 A | 6/1984 | Heffron et al. ............... 726/26 |
| 4,948,138 A | 8/1990 | Pease et al. |
| 5,274,827 A | 12/1993 | Haggarty et al. ........... 365/226 |
| 5,344,144 A | 9/1994 | Canon |
| 5,625,819 A | 4/1997 | Hoffer, Jr. |
| 5,643,086 A | 7/1997 | Alcorn et al. ................. 463/29 |
| 5,680,570 A | 10/1997 | Rantala et al. .............. 711/113 |
| 5,761,647 A | 6/1998 | Boushy ....................... 705/10 |
| 5,851,149 A | 12/1998 | Xidos et al. |
| 5,968,153 A | 10/1999 | Wheeler et al. ............ 710/110 |
| 5,971,851 A | 10/1999 | Pascal et al. |
| 6,070,202 A * | 5/2000 | Minkoff et al. ............... 710/56 |

(Continued)

FOREIGN PATENT DOCUMENTS

EP   1 255 234   11/2002

OTHER PUBLICATIONS

Levinthal, Adam and Barnett, Michael, "The Silicon Gaming Odyssey Slot Machine," Feb. 1997, Compon '97 Proceedings, IEEE San Jose, CA; IEEE Comput. Soc., pp. 296-301 (6 pages).

(Continued)

*Primary Examiner*—Christian P. Chace
(74) *Attorney, Agent, or Firm*—Beyer Weaver & Thomas LLP

(57) ABSTRACT

A method and apparatus of dynamically storing critical data of a gaming machine by allocating and deallocating memory space in a gaming machine is disclosed. One or more embodiments describe downloading or removing a new game to a gaming machine such that all existing critical data in NV-RAM memory is left intact. In one embodiment, the invention discloses a method and apparatus for dynamically allocating and deallocating memory space to accommodate either permanent or temporary storage in an NV-RAM. A method and apparatus is provided to monitor available memory space and dynamically resize the memory in NV-RAM. In one embodiment, a method is disclosed for performing an integrity check of the NV-RAM and determining whether a critical data error has occurred. In one or more embodiments, methods of compacting and shifting contents of an NV-RAM are described to consolidate available memory space or to prevent unauthorized access of NV-RAM memory.

28 Claims, 12 Drawing Sheets

U.S. PATENT DOCUMENTS

| | | | | |
|---|---|---|---|---|
| 6,099,408 | A | 8/2000 | Schneier et al. | 463/29 |
| 6,104,815 | A | 8/2000 | Alcorn et al. | 380/251 |
| 6,106,396 | A | 8/2000 | Alcorn et al. | 463/29 |
| 6,149,522 | A | 11/2000 | Alcorn et al. | 463/29 |
| 6,183,366 | B1 | 2/2001 | Goldberg et al. | 463/42 |
| 6,205,548 | B1* | 3/2001 | Hasbun | 713/2 |
| 6,253,374 | B1 | 6/2001 | Dresevic et al. | 717/11 |
| 6,412,053 | B1 | 6/2002 | Bonola | 711/170 |
| 6,446,257 | B1 | 9/2002 | Pradhan et al. | 717/154 |
| 6,449,687 | B1 | 9/2002 | Moriya | 711/112 |
| 6,453,319 | B1 | 9/2002 | Mattis et al. | 707/100 |
| 6,454,648 | B1 | 9/2002 | Kelly et al. | 463/16 |
| 6,467,038 | B1* | 10/2002 | Piwonka et al. | 713/1 |
| 6,488,580 | B1 | 12/2002 | Robb | 463/23 |
| 6,503,147 | B1 | 1/2003 | Stockdale et al. | 463/29 |
| 6,589,119 | B1 | 7/2003 | Orus et al. | 463/42 |
| 6,609,187 | B1* | 8/2003 | Merrell et al. | 711/173 |
| 6,816,956 | B1 | 11/2004 | Benayon et al. | 711/170 |
| 6,839,823 | B1 | 1/2005 | See et al. | |
| 6,874,075 | B1 | 3/2005 | Jerding et al. | 711/170 |
| 2002/0026566 | A1 | 2/2002 | Awada et al. | |
| 2002/0049909 | A1* | 4/2002 | Jackson et al. | 713/188 |

OTHER PUBLICATIONS

Intel Corporation, "Flash Memory PCI Add-in Card for Embedded Systems", Application Note: AP-758, Sep. 1997 (17 pages).

Dallas Semiconductor, "DS123: Flexible Non-volatile Controller with Lithium Battery Monitor," www.dalsemi.com, Nov. 1999 (12 pages).

U.S. Appl. No. 09/520,405 (28 pages).

Office Action dated Jun. 13, 2005 from corresponding U.S. Appl. No. 10/912,262 (12 pages).

Australian Office Action dated Sep. 30, 2005 from a Corresponding AU Application No. 79469/01 (4 pages).

* cited by examiner

DYNAMIC NV-RAM

This application is a continuation-in-part of application Ser. No. 09/690,931, filed Oct. 17, 2000 now U.S. Pat. No. 6,804,763, and entitled High Performance Battery Backed RAM Interface. Application Ser. No. 09/690,931 is attached herewith as an appendix.

FIELD OF THE INVENTION

The present invention relates to memory management and, in particular, a method and apparatus for dynamically storing critical data by allocating and deallocating memory space in a gaming machine.

BACKGROUND OF THE INVENTION

Advances in technology have led to gaming machines capable of providing a number of different games to a player. As a convenience to the player and as a way to extend his/her play time, multiple-game gaming machines can be a significant benefit to a casino. From the casino's perspective, a single gaming machine that is capable of playing a number of different games may provide a significant reduction in cost to the owner. It will also provide an enhanced experience to a player at reduced incremental cost to the casino owner.

In order to change the games stored on a gaming machine, a new game must be downloaded. This often requires that an existing game be removed from the gaming machine. When this is performed, the contents of the non-volatile random access memory (NV-RAM) must be modified. In systems of prior art, the modification requires that the existing NV-RAM memory be cleared and replaced with a newly compiled memory map reflecting the addition or removal of particular game(s).

The process of re-compiling or re-initialization of the contents of the NV-RAM undesirably deletes all information related to the gaming machine's critical data. Such critical data may comprise game history information, accounting information, security information, player tracking information, or any other type of historical state related information.

The game history information may provide a record of outcomes for a number of rounds of play for a game in a gaming machine. For example, the game history information may be used to verify the payouts of a gaming machine so that a verification of a winning jackpot may be performed before a payout is made if suspicious activity is recognized. Game history may also be used, for example, to audit the types of jackpots generated over a specified number of rounds of play or to provide evidence that a gaming machine has been tampered with. Hence, this type of information is critical to the casino or gaming machine owner.

Information that provides a running count or history of the credits that go in and out of the gaming machine may provide valuable accounting information. For example, a gaming machine's cumulative number of credits may be based on the bills or coins collected, the amount of credits generated from the insertion of a credit card, or bonus credits created by inputting a PIN (personal identification number). This type of data is extremely important to a casino owner because it provides the revenue a gaming machine generates over a period of time.

Security information may provide information related to a tampering event on the gaming machine. The details of this information may include time of day, type of game, the amount wagered, the specific outcome, and any operational information, such as diagnostics related to the condition of the gaming machine when tampering occurred.

Player tracking information is also vital to providing valuable feedback regarding a player's preferences. A casino may track player information to provide the best and most desirable playing environment to the player. Whether it be type of game, denomination of game, length of play, amount played, or the like, these factors provide invaluable information to the casino owner on how he/she can better attract and maintain play from a player.

Hence, it is important that the various critical data previously described be securely maintained during the addition or removal of a game from a gaming machine and at all other times. The deletion of critical data from NV-RAM results in numerous drawbacks.

As touched on above, the prior art process for adding or removing a game from a gaming machine requires a complete recompilation of the NV-RAM memory, creating a new fixed map. This procedure is tedious because it may require the careful removal and replacement of the existing NV-RAM from the gaming machine. It is contemplated that the NV-RAM may be reprogrammed without removing it from the gaming machine; however, the process may result in downtime and inconvenience to a customer, resulting in loss of casino revenue. Additional time and labor is required to accomplish this task for each gaming machine. As a result, the incremental cost per machine may be substantial.

Prior art systems utilize a fixed memory map approach that does not permit the dynamic use of NV-RAM memory space. Hence, the fixed memory map reserves memory that is often unused and un-needed for a game during the mapping process. Were this memory space not reserved, it could be used to store critical data associated with another game or created from the addition of new game software. This memory allocation procedure results in a barrier to providing efficient and expedient game changes on a gaming machine.

Thus, there is a need in the art for a method and apparatus for gaming machine memory management that overcomes the drawbacks of the prior art.

SUMMARY OF THE INVENTION

In one embodiment the invention comprises a method and apparatus for downloading a game onto a gaming machine without altering or deleting critical data unrelated to the added game. A method is described to dynamically verify and allocate adequate memory space for downloading critical data information into the non-volatile random access memory (NV-RAM). In one embodiment the NV-RAM's contents are verified after data is written into NV-RAM.

In one embodiment the invention comprises a method and apparatus for removing a game from a gaming machine without altering or deleting critical data unrelated to the removed game. After deleting the critical data related to the removed game, the NV-RAM is dynamically resized to increase the available memory size. In one embodiment the NV-RAM's contents are verified after data is written into NV-RAM.

In one embodiment a method and apparatus is provided for dynamically allocating and deallocating memory space to accommodate storage of either temporary or permanent data in an NV-RAM. The available memory is resized after an allocation or deallocation is performed. Temporary memory space is used only for the duration of the operational transaction required by the gaming machine, maximizing the use of memory space provided by the NV-RAM.

An embodiment is provided for monitoring available memory size of an NV-RAM and dynamically resizing memory allocations to suit the requirements of any critical game transaction for a gaming machine.

In one embodiment a method and apparatus is provided for identifying and replacing erroneous data stored in NV-RAM with corrected data without altering or deleting critical data unrelated to the erroneous data.

Further objects, features, and advantages of the present invention over the prior art will become apparent from the detailed description of the drawings which follows, when considered with the attached figures.

DETAILED DESCRIPTION OF THE INVENTION

Disclosed herein is a method and apparatus for dynamically downloading or removing a game(s) stored on a gaming machine without altering or deleting "critical data" unrelated to the added or removed game(s). The term critical data may be defined as data that records the past and present states of a gaming machine. Examples of such states include a game's history, accounting, security information, or the like. This type of critical data may be stored in a gaming machine's non-volatile memory or in a non-volatile storage device permanently or temporarily. In one embodiment when downloading or removing a game(s) in a gaming machine occurs, critical data is added or removed by allocating or deallocating memory space in a non-volatile random access memory (NV-RAM) of a gaming machine.

One embodiment of the invention relates to a method of downloading a game on a gaming machine without altering or deleting critical data unrelated to the added game. A number of embodiments of the invention relate to methods to maximize the use of free memory space in an NV-RAM during the course of the gaming machine's operation and maintenance. A number of embodiments of the invention relate to methods to efficiently utilize the memory space in an NV-RAM when a game is downloaded or removed from a gaming machine. One embodiment of the invention relates to a method of dynamically sizing the NV-RAM memory space based on the gaming machine's operational requirements. One embodiment of the invention relates to a method of identifying erroneous data within an NV-RAM, removing the erroneous data, and restoring correct data into NV-RAM. A number of embodiments of the invention relate to manipulation of the data over time so as to mitigate a willful modification of critical data by an unauthorized user. In the following descriptions, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
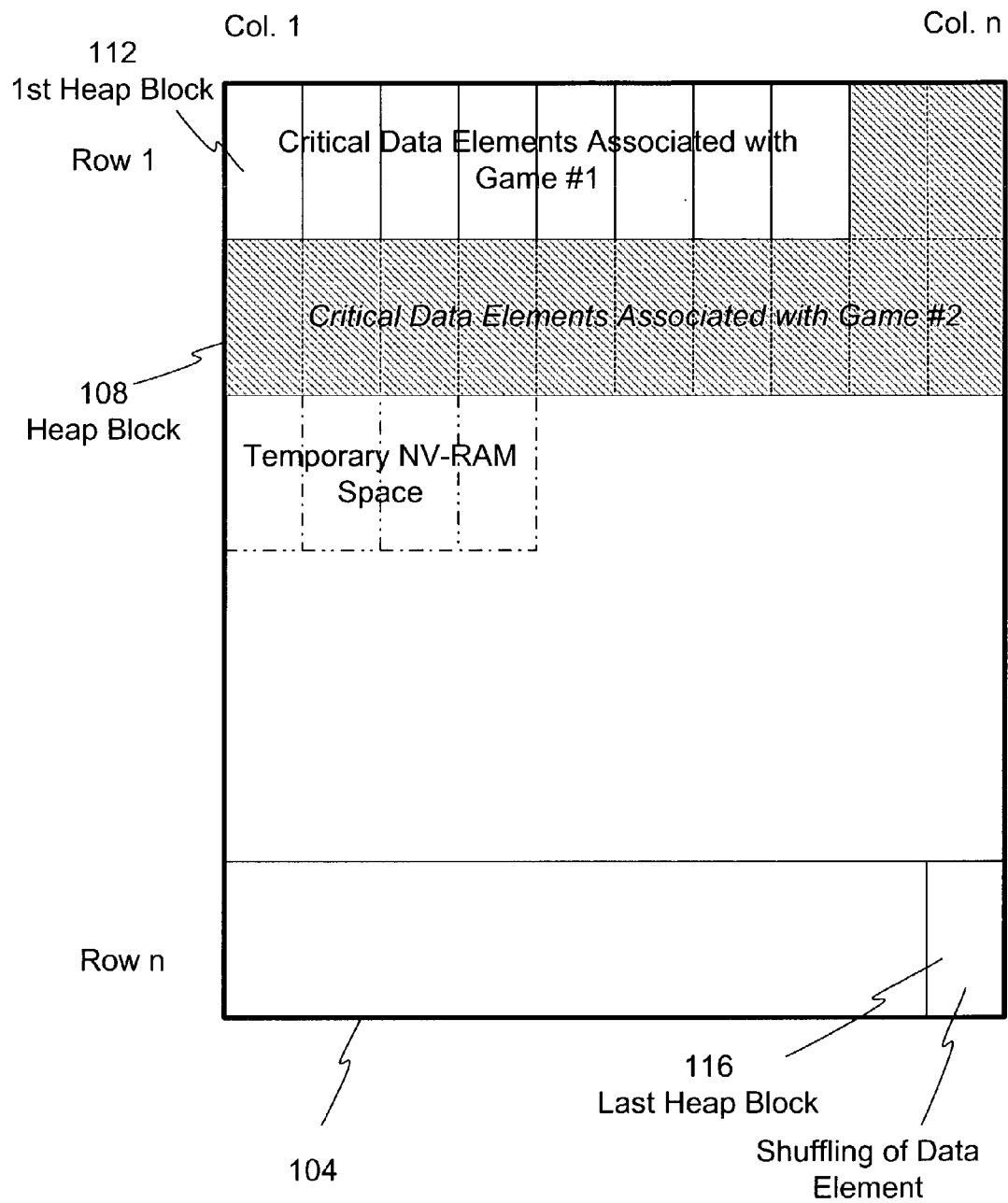
FIG. 1 illustrates a block diagram of an example embodiment of non-volatile random access memory.

FIG. 1 illustrates a block diagram of an example embodiment of non-volatile random access memory. In one embodiment the NV-RAM 104 consists of a number of memory elements arranged in rows and columns. For the purposes of discussion, a rudimentary memory element is described as a heap block 108. As illustrated in FIG. 1, the entire NV-RAM 104 comprises heap blocks 108 arranged in rows and columns. A particular heap block 108 may be specified by giving its row and column numbers. For the sake of simplicity, the example NV-RAM 104 is physically divided into 10 rows and 10 columns, providing a total of 100 heap blocks for the NV-RAM 104. For example, the first heap block 112, located at the top of the memory stack, may be referenced by its physical location in memory as the heap block located at (row 1, column 1), while the last heap block 116 may be referenced by its location defined by (row 10, column 10).

NV-RAM 104 plays a significant role in the normal operation of a gaming machine. The heap blocks 108 store data that may be classified as permanent or temporary data. The permanent type of data is described in this document as critical data. Critical data comprises data considered to be highly important. Critical data stores information related to the current or previous state(s) of a gaming machine. Examples of critical data include game history information, security information, accounting information, player tracking information, wide area progressive information, game state information, or any "critical" game related data. Critical data such as the amount of funds credited to or paid out from a gaming machine may be stored permanently in NV-RAM 104 as accounting information. This critical accounting information would reflect its current and prior states over successive rounds of play. To the casino owner, this information is important in determining the casino's profitability.

In contrast, temporary space may be used to process important commands related to the current state or operations of a gaming machine. After the commands are processed, the temporary space may be allocated for other purposes, such as storing critical data. For example, the operations that are necessary in transferring credits from a debit card to the gaming machine may require the use of data that is stored temporarily in the NV-RAM 104. This temporary, or non-critical, data may be used as part of a series of transactions or instructions to be executed. When the operations are completed, however, the contents of the memory may be purged, generating additional memory space.

NV-RAM 104 may maintain the contents of its memory over time through the use of a battery as a power source and is thus independent of externally supplied power. As a result, NV-RAM can continue to store data such as critical data as long as power is supplied. Typically, an NV-RAM contains its own internal battery source.

Figure 2A:
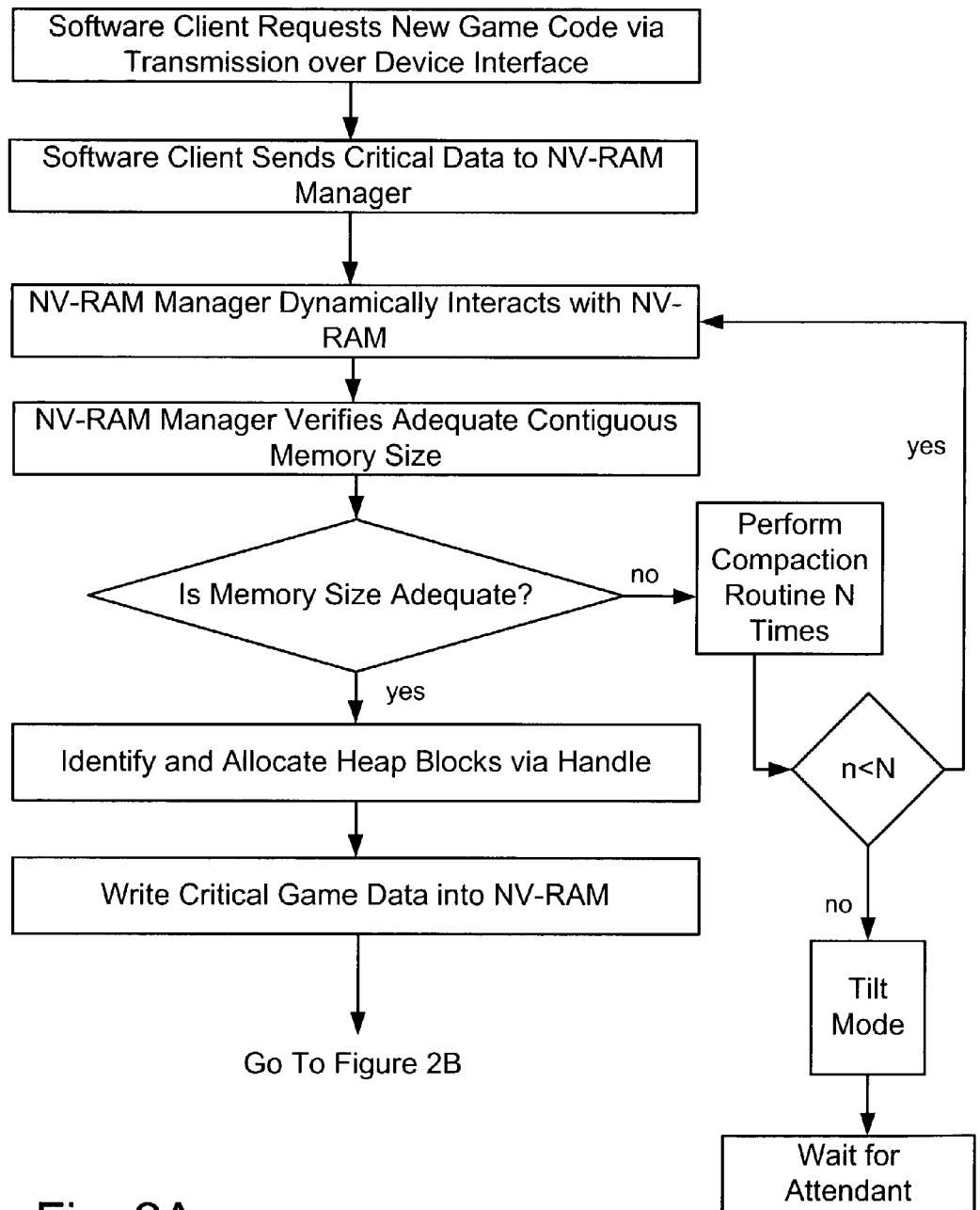
FIG. 2A illustrates an operational flow diagram of an example method for downloading a game into a gaming machine.

FIG. 2A illustrates an example method of downloading a new game to a gaming machine without destroying or deleting existing critical data. This is but one possible method of operation, and the present embodiment should not be considered as being limited to this example method of operation. In a step 204, a software client requests new game code. In one embodiment the request is transmitted though use of a device interface such as a key pad, touch pad, or card reader of a gaming machine. In other instances, the new game code may be transmitted from a remote computing device (i.e, workstation, server, or the like) or by a portable device (i.e., laptop, PDA, handheld, or the like) that may communicate with the gaming machine. The transmission may occur by either wireless or wireline communications. The software client may comprise a communication manager, bank manager, virtual player tracking manager, event distribution manager, event manager, or power hit detection manager. A more complete discussion of the term software client is disclosed in parent application Ser. No. 09/690,931, entitled High Performance Battery Backed RAM Interface, which is incorporated herein by reference.

At a step 208, the software client transfers critical data to or from an NV-RAM manager. In one embodiment the NV-RAM manager comprises non-volatile memory or non-volatile storage management software capable of effectively managing the non-volatile memory or non-volatile storage device. Critical data may be stored and accessed by a software controlled non-volatile memory or non-volatile storage file system. The non-volatile memory or non-volatile storage file system facilitates the viewing and modification of data residing in an NV-RAM. The non-volatile memory or non-volatile storage file system may be thought of as a file allocation system found in computer operating systems where files are organized by directories, subdirectories, and files. The NV-RAM manager communicates function requests to the NV-RAM. The function requests may include a request allocating or deallocating memory space, opening or closing files or data, and reading, writing, resizing, and moving of heap blocks within NV-RAM memory. As used herein, the term NV-RAM management system comprises a combination of the NV-RAM manager, the non-volatile memory or non-volatile storage file system, and NV-RAM, supported by processes executed by an operating system residing on the gaming machine. The operating system may comprise an operating system manufactured from companies such as a Microsoft, Apple, or LINUX. The NV-RAM management system may use standard application tools, such as a word processor program, to view the contents in NV-RAM. It is contemplated that any word processor, in conjunction with the non-volatile memory or non-volatile storage file system, may facilitate the display, addition, removal, and modification of critical data associated with the addition or removal of a particular game(s) within NV-RAM. An example word processor program includes Corel Word Perfect or Microsoft Word. The NV-RAM management system leaves existing critical data resident in NV-RAM intact during any addition or removal of critical data.

At a step 212, the NV-RAM manager dynamically interacts with the NV-RAM to perform function requests related to allocating or deallocating heap blocks that relate to writing or deleting critical data. The function requests are performed in collaboration with the software client and may comprise any one of the requests mentioned in the preceding paragraph.

At a step 216, the NV-RAM manager allocates the amount of NV-RAM required for the new game. It is contemplated that a program executed by the software client or hardware device may determine the size of the game to be loaded into NV-RAM. This information may be communicated to the manager in any manner. Thereafter, the NV-RAM manager verifies that adequate memory space exists and issues a request to allocate memory. The NV-RAM manager may perform an open function request to access an existing NV-RAM memory node. A node represents a range of related heap blocks in NV-RAM. A read function request on the NV-RAM provides a handle (or address) for the NV-RAM node of interest associated with a range of heap blocks. The heap blocks comprise used or unused blocks of memory associated with a particular handle. In sum, the appropriate heap blocks are allocated by the NV-RAM manager for a subsequent write function.

At a step 220, a decision is made regarding whether or not the memory size is adequate. If the memory size is not adequate, the process proceeds to step 224, in which a process called compaction, described below in more detail, is performed up to a set number of times, in this embodiment N times, to reorganize (or defragment) the memory. The process of compaction generates unused contiguous memory of a size sufficient for the storage of new critical data. At a step 228, the operation determines whether the number of compaction routines performed is less than or equal to N and continues the operation until n=N. If the available memory size is still insufficient, then the process terminates at a step 232, as indicated by Tilt Mode. A step 236 follows, indicating that the gaming machine now requires human intervention.

Alternatively, if at step 240 the adequate memory size is available, the operation proceeds to a step 240, wherein the available heap blocks are identified and a dynamic allocation of the heap blocks takes place. An appropriate number of heap blocks are assigned to the node with a unique handle. At a step 244, the NV-RAM manager performs a write function of the critical data associated with the new game onto contiguous heap blocks in NV-RAM.

FIG. 1 may aid in understanding the process described by steps 204–244 of FIG. 2A. As shown, a second game is added to an NV-RAM 104; the NV-RAM previously contained critical data elements associated with an existing game #1. As shown, the critical data elements corresponding to the first game have been stored in the first 8 heap blocks 108 of the NV-RAM 104 (i.e., row 1, columns 1–8). As part of the above-described process, the NV-RAM manager determines that the critical data requires 12 heap blocks. The NV-RAM manager facilitates the allocation of 12 contiguous heap blocks in NV-RAM. As illustrated in FIG. 1, the next 12 sequential heap blocks are allocated corresponding to the last two heap blocks in row 1 and all of row 2.

Figure 2B:
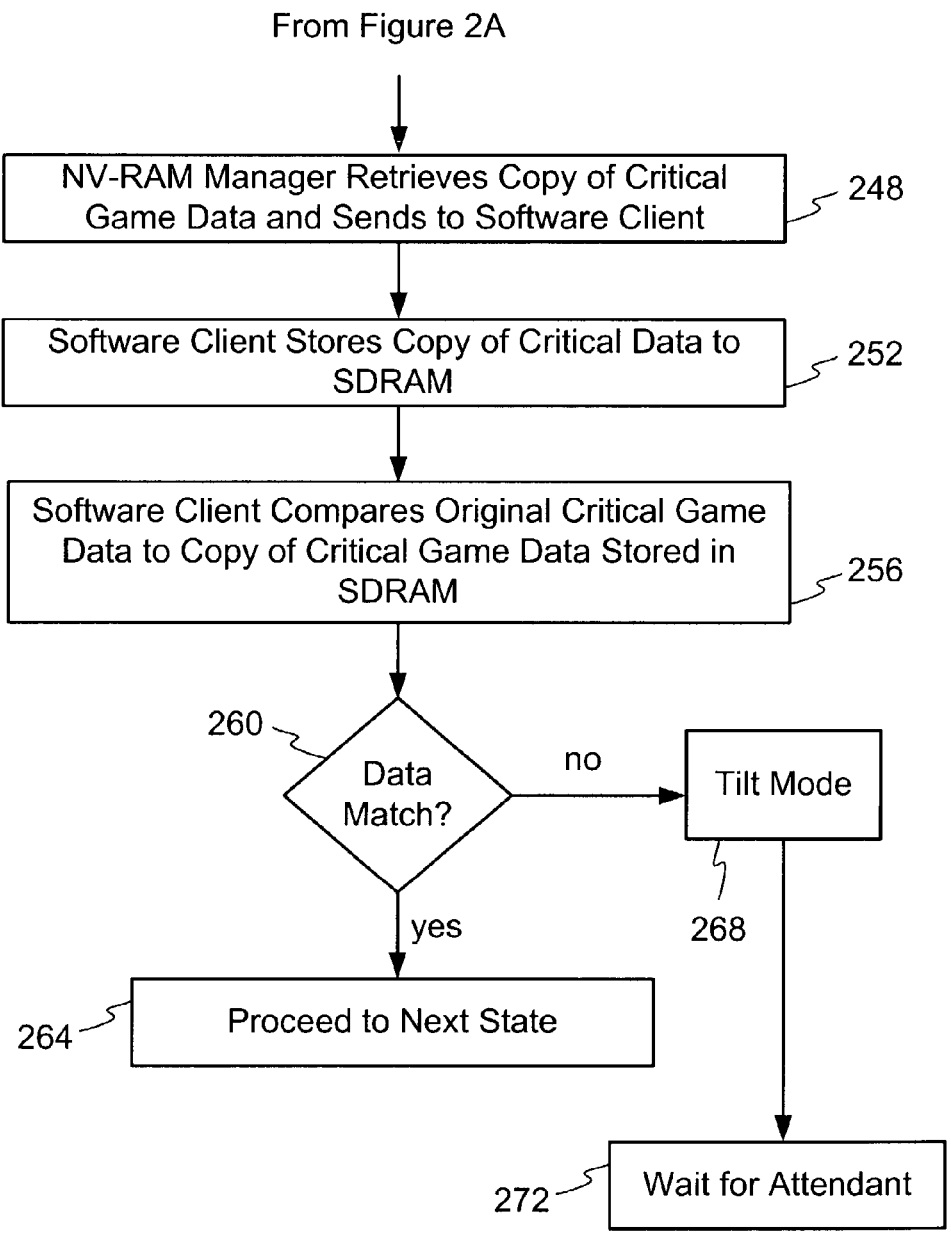
FIG. 2B illustrates an operational flow diagram of an example method for verifying contents of non-volatile random access memory after downloading a game into a gaming machine.

Returning to the method described in conjunction with FIG. 2, and in reference to FIG. 2A, the following discussion relates to verification of data integrity. At a step 248, the NV-RAM manager retrieves a copy of the original critical game data from the device interface and sends it to the software client, where it is stored in a first location in a memory, such as SDRAM or any other memory device.

SDRAM is synchronous dynamic random access memory and may be used to store data required for immediate processing performed by a processor in a gaming machine. This type of random access memory provides faster read and write cycle times but is not feasible for use in long term storage of critical data information in a gaming machine. Thereafter, at a step 252, the software client stores a copy of the data retrieved from NV-RAM in SDRAM.

Next, at a step 256, the software client compares the original critical game data in SDRAM with critical game data stored in NV-RAM. It is contemplated that a CRC may be performed on the original critical game data, as well as the data stored in NV-RAM, to verify that the data has not been altered. Thereafter, a decision is made, at a step 260, regarding whether or not the data stored in SDRAM matches the data stored in NV-RAM. If the data matches, the operation proceeds to a step 264. Alternatively, if the data does not match, the gaming machine enters a tilt mode as shown in step 268, and a wait state is entered at a step 272. This process insures that the critical data associated with new game software is written into NV-RAM without error before game play may occur.

The aforementioned steps represent a method to dynamically allocate memory space of an NV-RAM comprising the storage of critical game information related to the addition of a new game. As an advantage to this method over the prior art, the addition of the new game does not affect any critical data previously written into the NV-RAM, such as data associated with another game. Hence, the method insures the preservation of existing critical game information in NV-RAM without the need to re-initialize and re-map the contents of the entire NV-RAM memory.

Figure 3:
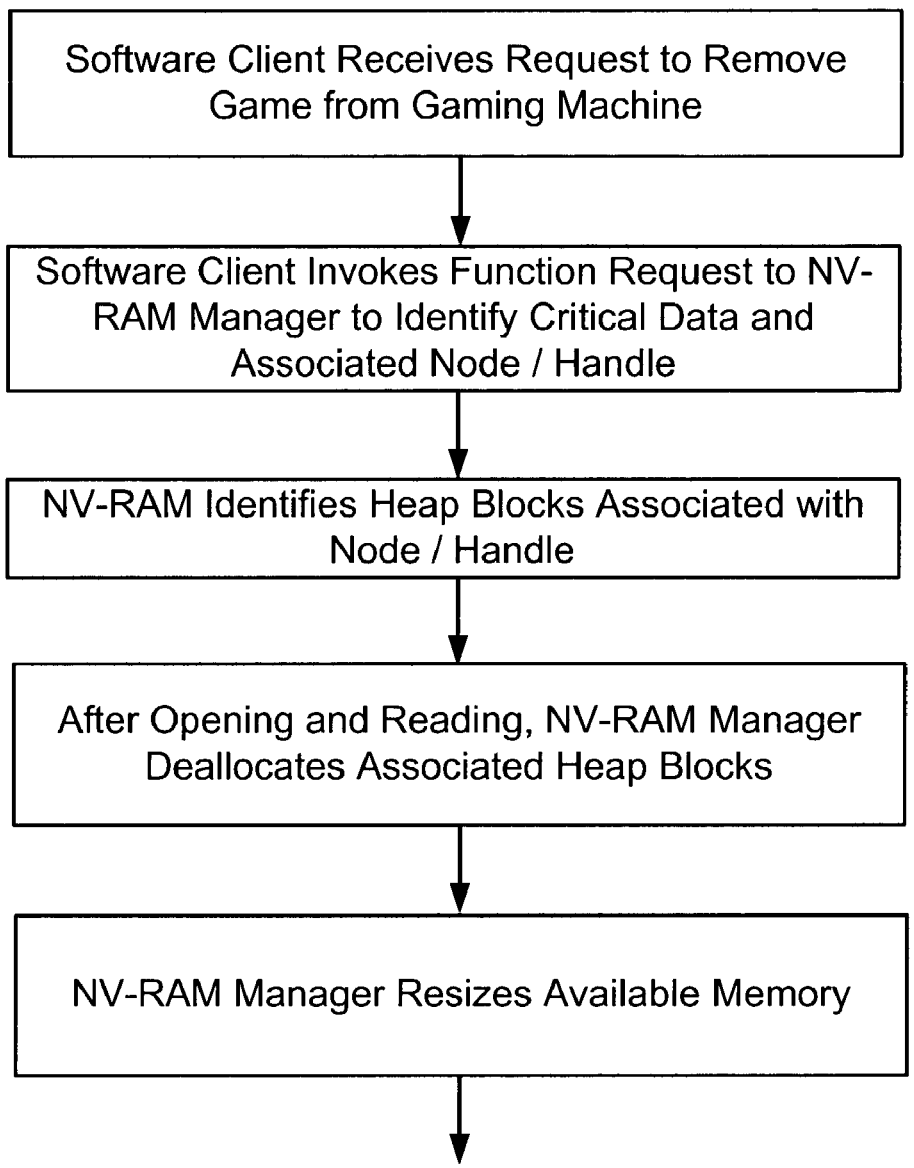
FIG. 3 illustrates an operational flow diagram of an example method memory management during removal of a game from a gaming machine.

FIG. 3 illustrates an operational flow diagram of an example method of deallocating or deleting critical data associated with the removal of a game from a multi-game gaming machine. When a game is removed, critical data associated with that particular game may be removed from the gaming machine. As an advantage to this method, a game may be removed from a gaming machine without disrupting the storage of other data, such as critical data, in the gaming machine. As a result, games may be rapidly and efficiently removed from a gaming machine. Moreover, these operations may be undertaken by service technicians without need of software experts.

At a step 304, a software client receives a request to remove a game from a gaming machine. Next, at a step 308, the software client invokes a function request to the NV-RAM manager to identify the handle or node of the critical data associated with the game to be removed. At a step 312, the heap blocks of memory corresponding to the node are tagged for removal. In step 316, the NV-RAM manager removes the NV-RAM heap blocks by deallocating the appropriate range of heap blocks. As part of this process, the heap block may be opened and read.

After removal of the data contained in the range of heap blocks, as shown at a step 320, the remaining available heap blocks in memory are resized to thereby provide a potentially larger memory space for future critical data storage. At a step 324, the NV-RAM manager or any other device, system, or software verifies the accuracy of the critical data stored in NV-RAM.

Figure 4A:
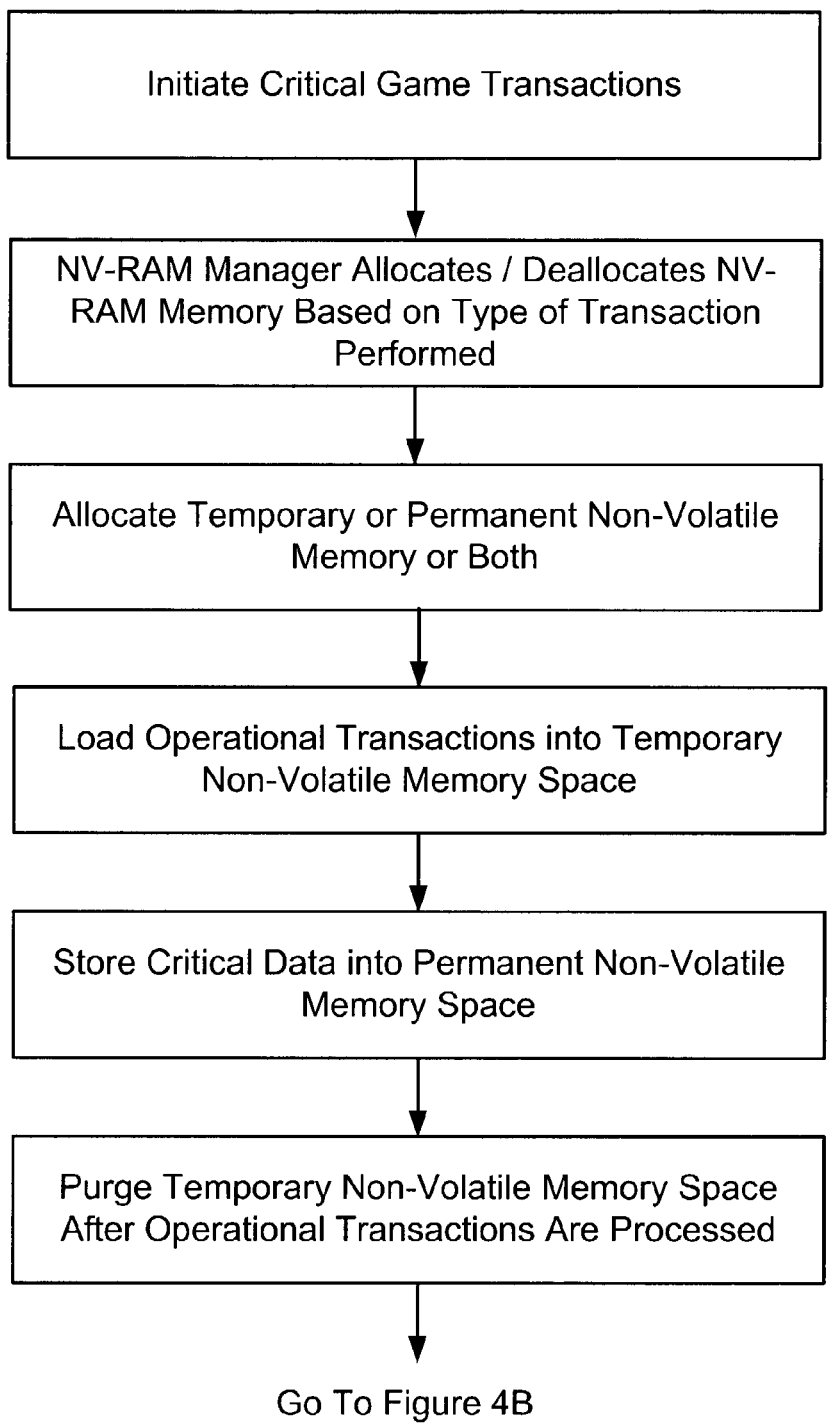
FIG. 4A illustrates an operational flow diagram of an example method for allocating and deallocating memory space during a critical game transaction.

FIG. 4A illustrates an operational flow diagram of an example method of dynamically resizing available memory space in a gaming machine. The advantages of applying this method include the allocation and deallocation of memory space as required. When memory is required to perform an operational transaction, memory space is allocated only during that period of time when it is needed. When memory is deallocated, the memory is resized, providing increased available memory space for subsequent use.

At a step 404, the operation initiates a critical game transaction. Examples of critical game transactions include, but are not limited to, reading the credit information from a debit card, adding an amount of credit to a gaming machine, and accepting currency from a player. The critical game transaction may require the use of NV-RAM either temporarily or more permanently. The NV-RAM may store values temporarily as an intermediate step in the calculation of critical data. For example, when accepting currency from a player, a bill validator may determine the value of the currency as an integer number of dollars. This information may be stored into NV-RAM temporarily, as an intermediate operational step, prior to determining the number of credits credited in the gaming machine. If the game comprises a 25 cent game, the number of credits calculated would correspond to forty credits if the player inserts a ten dollar bill. In this example, the critical data stored permanently in NV-RAM may comprise the number of credits (forty), although the number of dollars (ten) would comprise an intermediate operational value in the calculation of the number of credits. As a consequence, the intermediate value ten may comprise data that is stored temporarily in NV-RAM and is deleted upon the calculation of the critical data value forty which may be stored permanently in NV-RAM.

At a step 408, the NV-RAM manager allocates memory to facilitate a critical game transaction. The NV-RAM manager may allocate memory in preparation for storage of an example critical data associated with a game download, or it may deallocate memory (as when deleting contents from temporary NV-RAM memory) if a particular data is no longer required on the gaming machine. Typically, a critical game transaction will cause the NV-RAM manager to allocate memory space either temporarily or permanently, as shown at a step 412. The new data will reside in memory over a period of time as dictated by its function. At a step 416, operational transaction data is loaded, on a temporary basis, into NV-RAM space. As described earlier, this data may be used in an intermediate step as part of the calculation of a critical data. Thereafter, at a step 420, the resulting critical data is stored permanently in NV-RAM memory. At a step 424, data created, stored, or used for intermediate operational transactions may be destroyed, and the NV-RAM memory space may be deallocated.

Figure 4B:
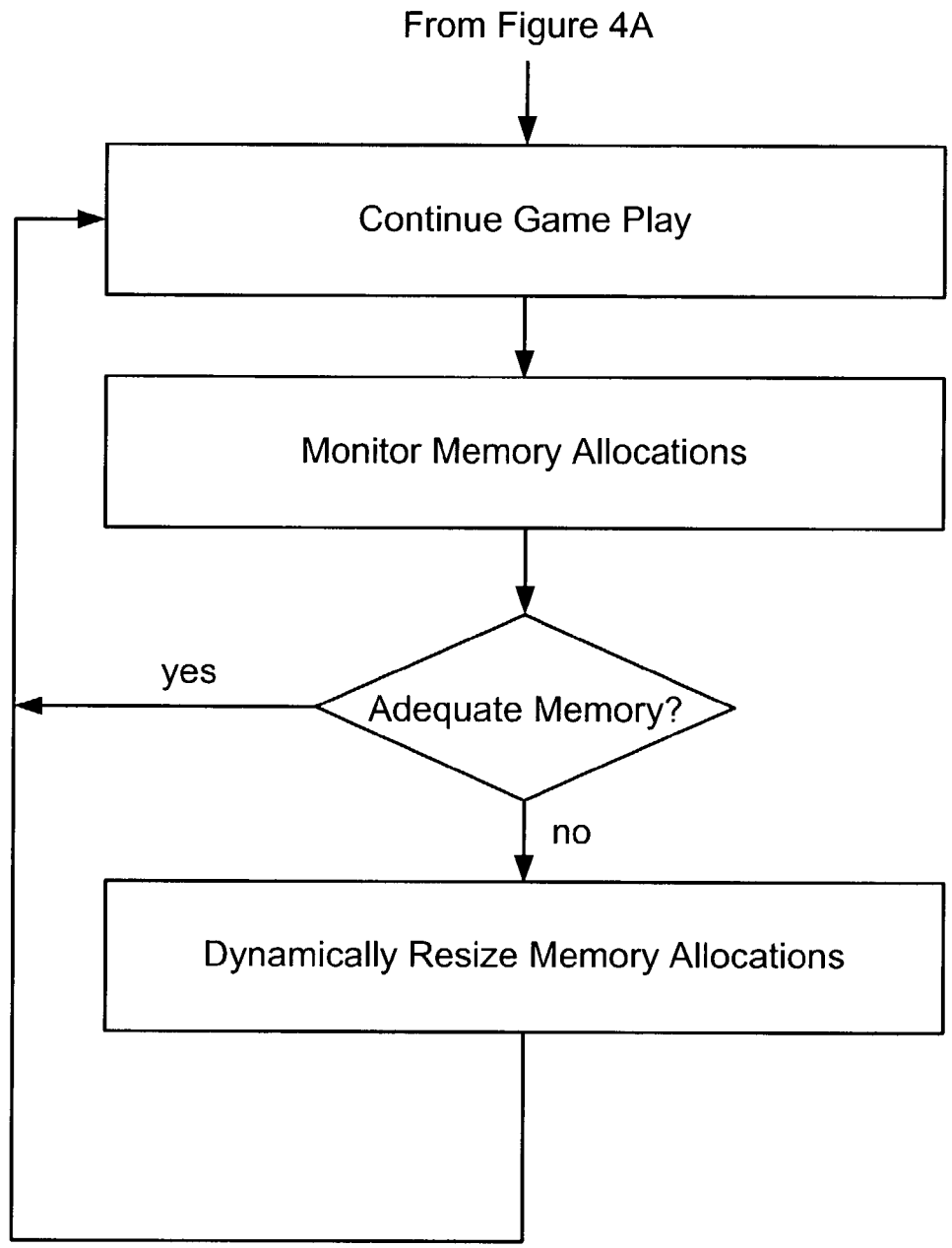
FIG. 4B illustrates an operational flow diagram of an example method for monitoring and dynamically resizing available memory space within a non-volatile random access memory.

Continuing on to FIG. 4B, the gaming machine may enter a game play mode at a step 428. During the course of game play, the gaming machine may undergo a number of different events, such as receiving currency, hopper tilt, reel tilt, protective tilt, power loss, player's card input, player's card removal, personal identification input, reel spin, multi-denomination change, jackpot tilt, and the like. During these transactional events, the temporary or permanent non-volatile memory or non-volatile storage requirements of the game or the gaming machine may change. Accordingly, at a step 428, the memory space allocations are continuously monitored. A decision occurs at a step 432 regarding the adequacy of memory at any point in time during gaming machine operation.

If memory is adequate, the gaming machine resumes game play by returning to step 424. Alternatively, if at step 532 the system determines that the memory space or size allocations are not adequate, the operation then advances to a step 436. At step 436, the operation dynamically resizes memory to facilitate a game play or any other operational transaction. The process may involve compaction, described below in more detail, to provide contiguous memory large enough for a particular transaction to occur.

Referring back to FIG. 1, a temporary NV-RAM memory space is illustrated as the first four heap blocks in third row 120 of the NV-RAM 104. It is contemplated that these blocks are used to store intermediate data required in the generation of critical data. For example, the critical data associated with the second game, contained in heap blocks located in row 2, columns 1–10, may have been generated through the use of data stored in the temporary NV-RAM space. The contents in temporary NV-RAM space 120 may be deleted after use, and the associated heap blocks may be deallocated.

Figure 5:
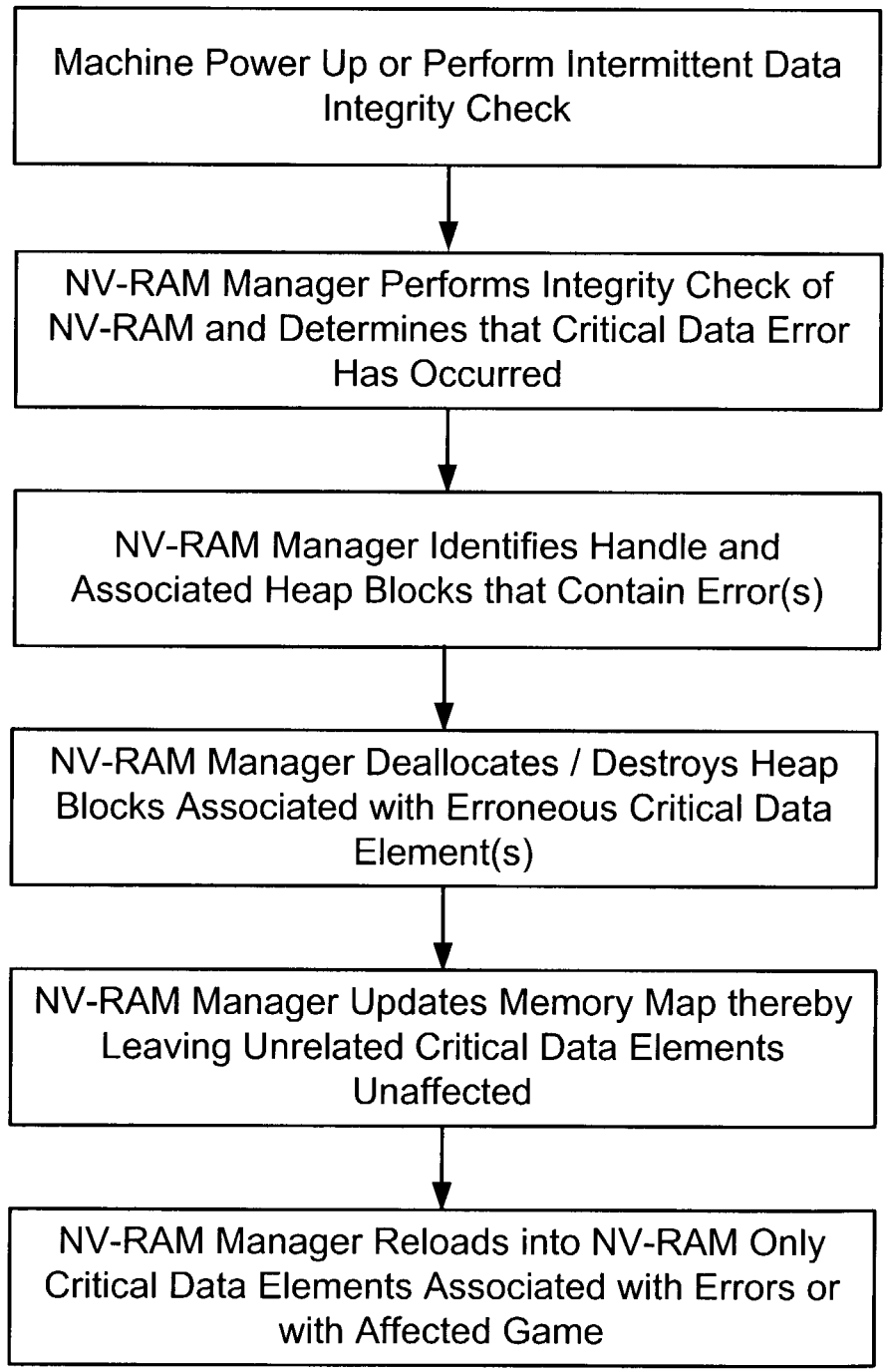
FIG. 5 illustrates an operational flow diagram of an example method for performing an integrity check of data in non-volatile random access memory.

FIG. 5 illustrates an operational flow diagram of an example method for performing an integrity check of data in non-volatile random access memory. In one embodiment this method is utilized to detect and fix changes to data that may have been caused by an electrical problem, such as a static discharge or a high voltage surge. This process may begin by powering up a gaming machine. This is shown at a step 504. The gaming machine performs an initialization of an NV-RAM which may include integrity testing of the memory.

In one embodiment the integrity testing comprises a CRC (cyclic redundancy check) algorithm or another method, such as a checksum, to determine if a critical data element stored in the NV-RAM contains an error. When the gaming machine is powered up, the state of the machine prior to its power up will be captured in the NV-RAM header. The state information may comprise a particular signature that may be recognized during the integrity check. For example, a particular signature may indicate that the gaming machine has a particular malfunction or that power was interrupted during its previous operation. If the signatures generated for the NV-RAM header do not correspond with the signatures stored in the NV-RAM header, an error in critical data may have occurred, such as a tampering of the gaming machine or some other hardware or software malfunction. A further check of the NV-RAM heap blocks may indicate errors in the critical data. In the case where the signature indicates that a power outage had occurred, the NV-RAM manager may be directed to further perform an integrity check of memory contents within a heap block that contains the critical data associated with the particular operation during the time the power outage occurred.

Thereafter, at a step 508, the NV-RAM manager performs an integrity check on the NV-RAM and determines errors in a critical data element. At a step 512, the NV-RAM manager identifies the handle of the erroneous critical data element and determines the appropriate heap blocks that contain the erroneous critical data element. In one embodiment this comprises the NV-RAM manager performing an open function request to access memory containing the affected heap blocks. A read function request may then generate the appropriate ranges of heap blocks that require removal.

At a step 516, the NV-RAM manager performs a delete function request, allowing the NV-RAM to delete the heap blocks associated with the discovered error. At a step 520, any heap blocks containing unrelated critical data elements are left intact within the NV-RAM as the NV-RAM manager reloads the affected data into the appropriate locations in NV-RAM to restore the integrity of the critical data. In one embodiment, after the reload or rewrite occurs, the restored data may be re-tested. In one embodiment, an alert may be generated upon defection of corrupt data.

As an advantage to this embodiment, the error removal process is such that a minimal subset of all critical data elements are cleared from non-volatile memory or non-volatile storage. As a result, the process described in FIG. 5 typically removes the erroneous critical data element while leaving intact all other critical data elements that are unrelated to the erroneous critical data element.

In the prior art, an error in a data element required the re-initialization or clearing of the entire NV-RAM, causing the loss of all data unrelated to the error. This is undesirable because all of the critical data is lost or must be reloaded.

Figure 6A:
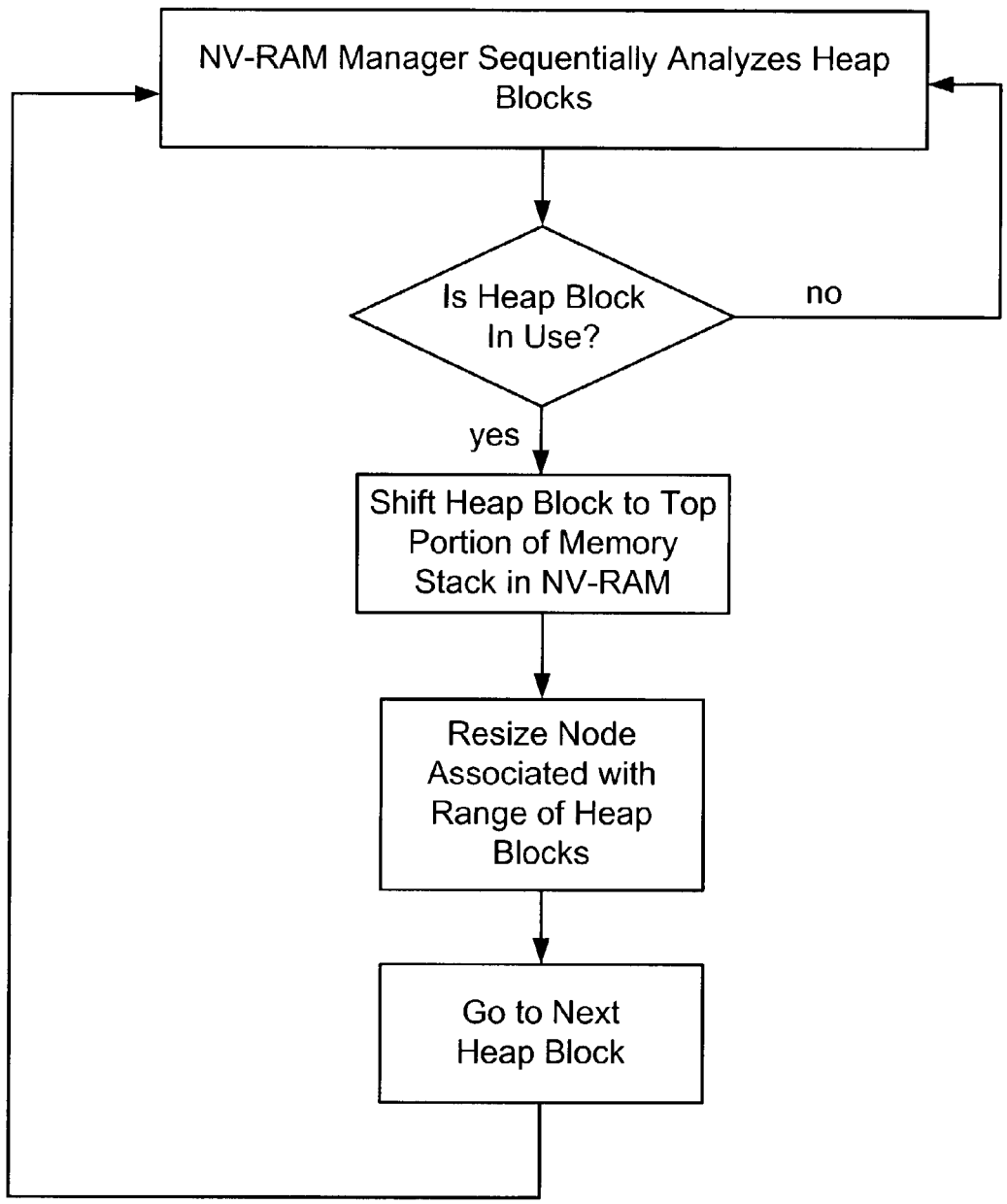
FIG. 6A illustrates an operational flow diagram of an example method for compaction or reorganizing memory space in non-volatile random access memory.
Figure 6B:
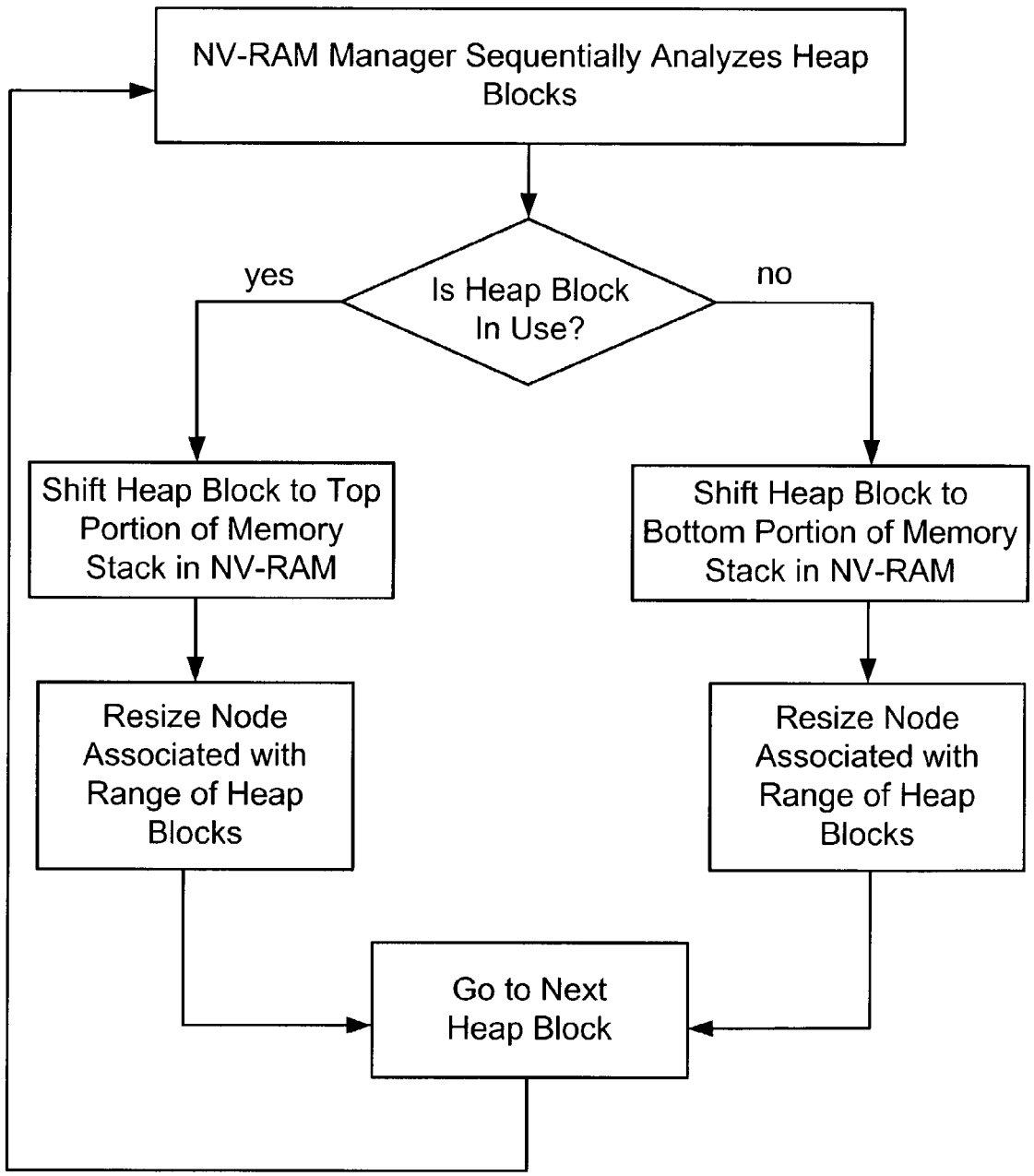
FIG. 6B illustrates an operational flow diagram of an alternate example method for compaction or reorganizing memory space in non-volatile random access memory.
Figure 6C:
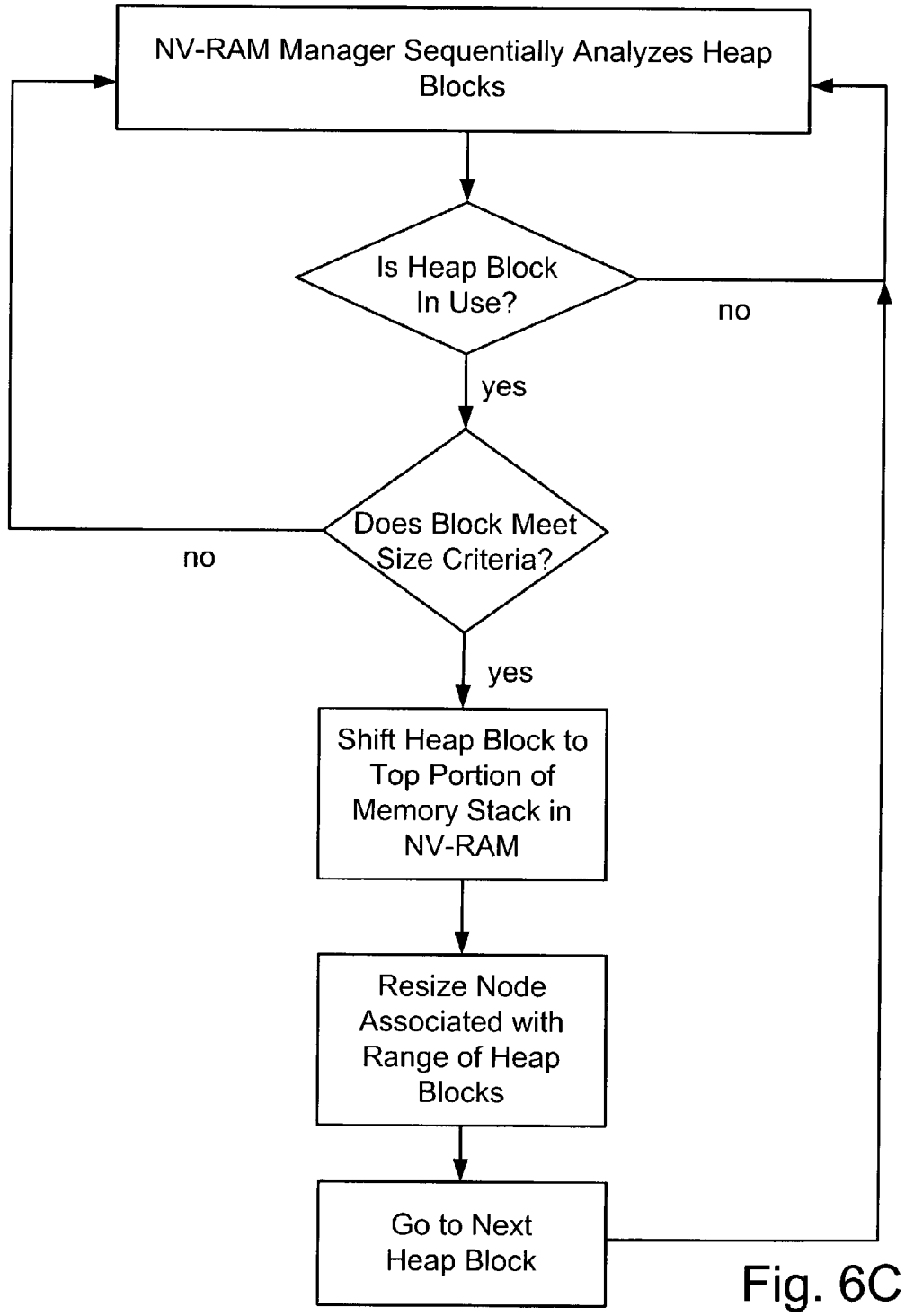
FIG. 6C illustrates an operational flow diagram of an alternate example method for compaction or reorganizing memory space in non-volatile random access memory.

FIGS. 6A, 6B, and 6C illustrate example methods of NV-RAM compaction. Compaction is a process of re-organizing used and free memory within an NV-RAM to consolidate the free memory space into a larger size or into the largest contiguous memory size possible. The process of compaction causes an NV-RAM manager to write related critical data over a series of contiguous heap blocks. The process results in more efficient write and read functions performed by the NV-RAM manager. As a consequence, performance is improved significantly when related data is stored contiguously. Further, compaction achieves more efficient use of the memory by allowing a block of data to be written contiguously.

FIG. 6A illustrates an alternate embodiment of a method of compacting or reorganizing memory in NV-RAM. This may be accomplished by segregating used heap blocks from unused heap blocks. In a step 604, the NV-RAM manager sequentially analyzes heap blocks in NV-RAM. It is contemplated that the NV-RAM manager starts analyzing at the location of the first heap block (row 1, column 1) of the NV-RAM as described in FIG. 1, or at any location. In a step 608, a determination is made whether the heap block is in use (contains data). If the heap block is in use, the heap block is shifted or positioned to the top portion of the NV-RAM memory stack at a step 612. The used heap blocks that are shifted to the top portion of NV-RAM may be sorted based on the type of critical data stored within the heap block. The sorting criteria may include the type of critical data (i.e., accounting vs. game history data), type of game, or any other factor.

At a step 616, the nodes are resized to reflect the number of heap blocks associated with a particular node. A node is discussed in parent application Ser. No. 09/690,931, High Performance Battery Backed RAM Interface. Thereafter, at a step 620, the next heap block is analyzed and the process repeats itself by returning to a step 604. The process may time out or stop after the entire NV-RAM memory is compacted.

At a step 608, if the heap block is unused, the process reverts back to step 604, where the next heap block is analyzed. It is contemplated that the process of shifting heap blocks can be controlled by the software client in conjunction with the NV-RAM manager. It is contemplated that the process may commence and terminate based on factors such as time of day, frequency of NV-RAM use, the rounds of play on the gaming machine, or some other criteria.

FIG. 6B illustrates an alternate embodiment of a method for compacting or reorganizing memory in NV-RAM. This may be accomplished by shifting heap blocks either to the top or to the bottom of the NV-RAM memory stack. At a step 624, the NV-RAM manager sequentially analyzes the heap blocks in NV-RAM. As described in FIG. 6A, the NV-RAM manager may begin analysis starting at the first heap block located at (row 1, column 1) of the NV-RAM or from any other location. At a step 628, a decision is made concerning whether or not the heap block in use.

If the heap block is in use, the process advances to a step 632, where the heap block is shifted to the top portion of NV-RAM. If the heap block is unused, the process advances to a step 636, and the heap block is shifted to the bottom portion of the NV-RAM memory stack. Thereafter, in either case, the associated nodes are resized to reflect the new re-organization or new ranges of used or unused heap blocks. This is illustrated at steps 640 and 644. At a step 648, the next heap block is analyzed and the process repeats itself. Because shifting of heap blocks is performed on both in use and unused heap blocks, it is contemplated that the system described in FIG. 6B may provide a faster method of compaction as compared to the system described in FIG. 6A.

FIG. 6C illustrates an alternate embodiment of a system of compacting or reorganizing memory in NV-RAM. This may be accomplished by shifting heap blocks to the top of the NV-RAM memory stack based on particular criteria. At a step 652, the NV-RAM manager sequentially analyzes the heap blocks in NV-RAM. At a step 656, a decision is made as to whether or not a heap block is in use. If the heap block contains data, the process proceeds to a step 660. Next, a decision is made concerning block size criteria. For example, the size criteria may be that the heap block size is less than or equal to 200 kilobytes before heap block shifting occurs. This type of criteria may facilitate the shifting of smaller blocks prior to the shifting of larger blocks, and the criteria may be controlled, such as for example, by a casino employee. At a step 664, an in use heap block meeting the desired criteria is shifted to the top portion of the memory stack in NV-RAM. It is contemplated the heap block may be shifted to portions of memory other than the top portion as described in this example embodiment. At a step 668, the range of available heap blocks is resized to reflect the additional available memory space. Next, at a step 672, the process repeats itself as the NV-RAM manager analyzes the next heap block.

It is contemplated that the shifting of heap blocks as described in FIGS. 6A, 6B, or 6C may be accomplished by shifting data to a distinct portion of memory different from that of the top or bottom of an NV-RAM memory stack. The methods of shifting to a specific location as described in these embodiments are examples and are meant for discussion purposes. Furthermore, it is contemplated that compacting may occur more readily when the availability of unused NV-RAM is low. In addition, it is contemplated that compacting may occur periodically or on specific times in a day, or specific days in a week. As part of initializing the NV-RAM, it is contemplated the NV-RAM is compacted when the NV-RAM manager is first started.

Figure 7:
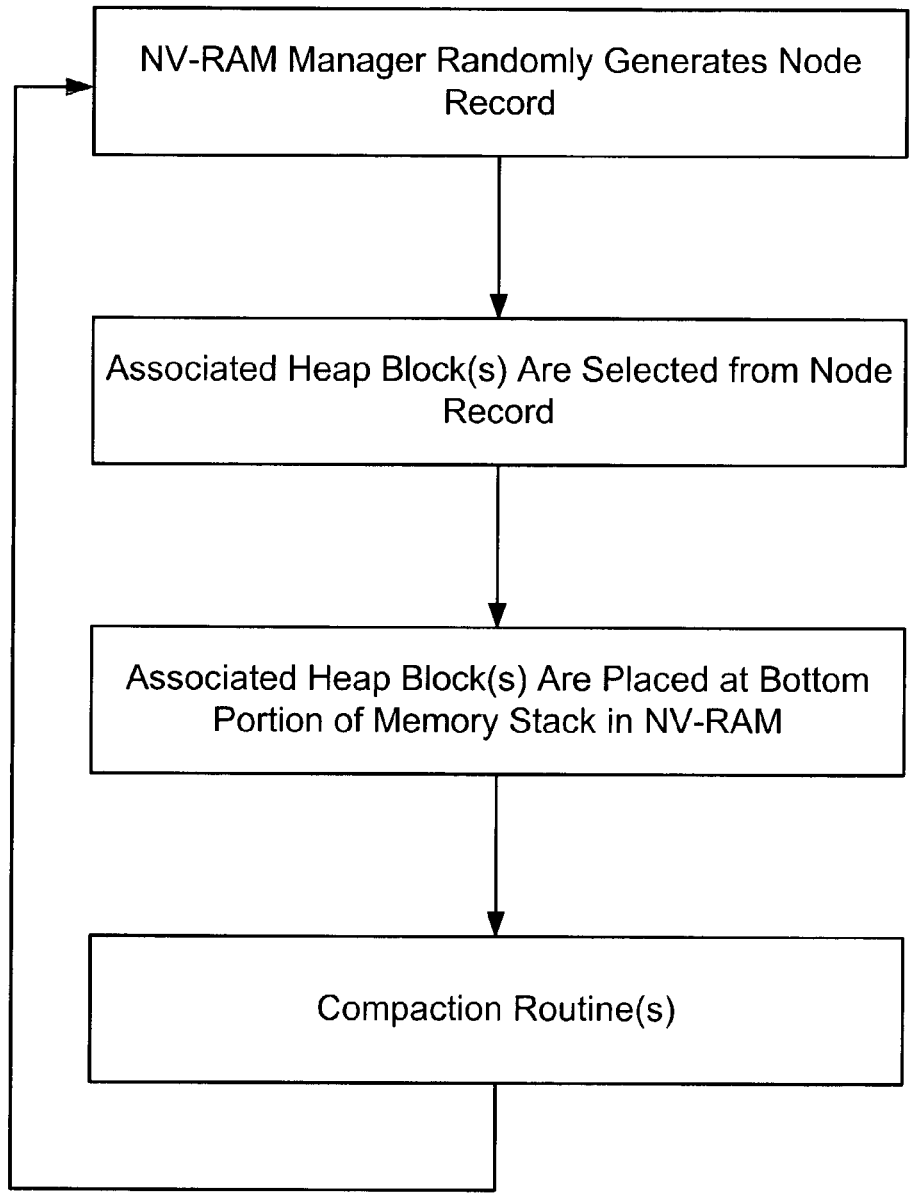
FIG. 7 illustrates an operational flow diagram of an example method of data re-ordering in memory.

FIG. 7 illustrates an example method of shifting the contents of heap blocks to various locations within NV-RAM memory. This process may occur to provide additional security by re-organizing data in memory to prevent unauthorized access of data. By continually or periodically changing the location of data in memory, the ability of an individual to access a particular type of data is reduced.

At a step 704, the NV-RAM manager randomly generates a node record. A node record stores a handle for the NV-RAM which may be a unique handle. This handle, used by the software client, may provide a pointer to the location in NV-RAM at where the node or file resides. Further, the node record may provide the file size, file name, and information regarding the status of the file. It is contemplated the status may be a flag that indicates and allows a possible resizing or removal of data in NV-RAM to occur. At a step 708, an associated heap block or a random heap block corresponding to the node record is selected. At a step 712, the heap blocks are placed at the bottom portion of the memory stack in NV-RAM. It is contemplated that data may be shifted to portions of the memory stack other than the bottom portion. FIG. 1 illustrates the physical location of the heap block as a result of shuffling the data to the bottom portion of the memory stack (shown as the heap block in (row 10, column 10)).

Next, in step 716, a compaction routine, such as that described in FIGS. 6A, B, or C, may be employed. The process hinders an unauthorized user's ability to identify the contents of a particular heap block because the contents of randomly selected heap blocks are continuously shifting to a new location within the NV-RAM.

Figure 8:
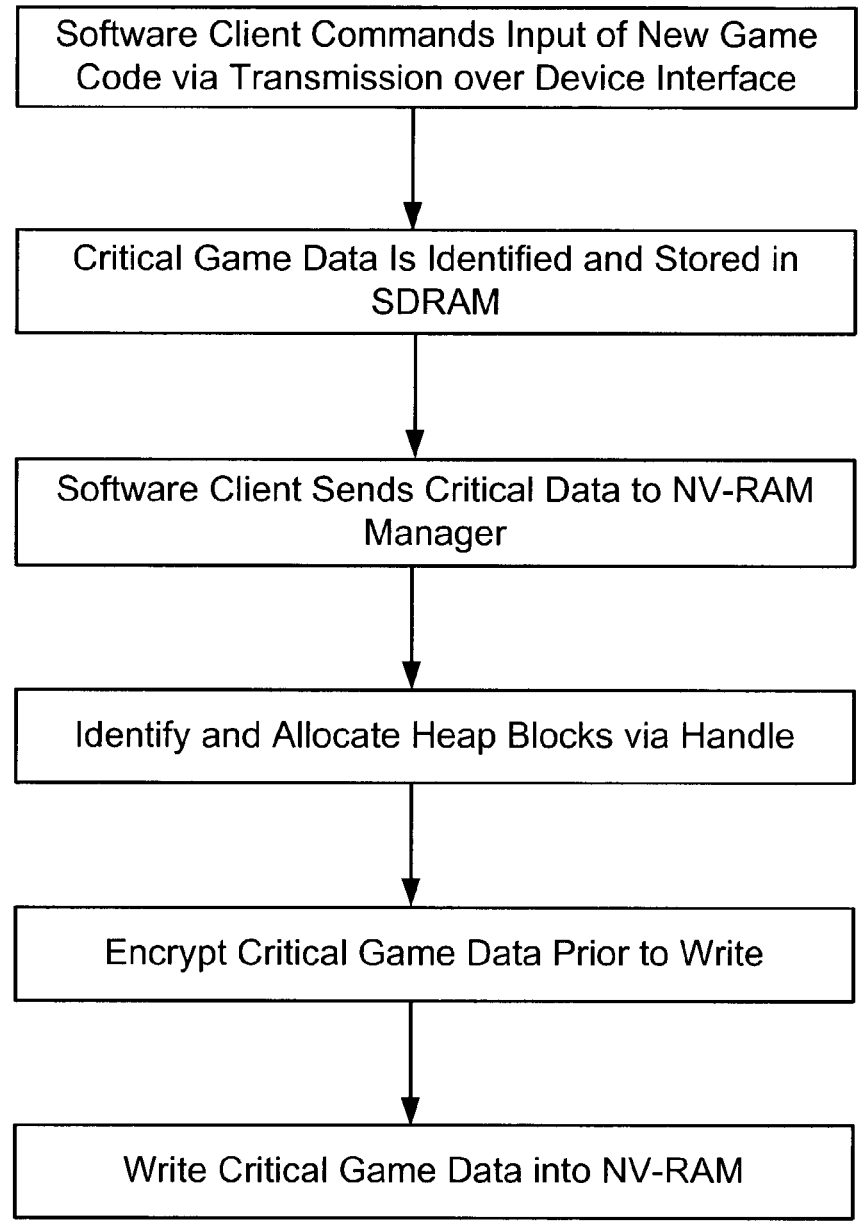
FIG. 8 is an operational flow diagram of an example method of encrypting data prior to writing the data into memory.

FIG. 8 illustrates an operational flow diagram of an alternate method of operation of a system to prevent unauthorized access of data written into NV-RAM. At a step 808, critical game data associated with game code is identified and stored in SDRAM. At a step 812, the NV-RAM manager facilitates the processing of the critical data by providing the critical data to the NV-RAM manager. At a step 816, the NV-RAM manager identifies and allocates heap blocks to store the critical data. At a step 820, the NV-RAM facilitates the encryption and subsequent storage of critical data into SDRAM. The encryption can be any simple type of encryption. In one embodiment, the encryption comprises multiplying the critical data by a number that is unique to a gaming machine. This creates a unique encryption key that would not be known by a potential cheater. At a step 824, the encrypted critical data is written into NV-RAM.

It is contemplated that the above-described software may be embodied in machine readable code, such as software code and computer programs, that are processor executable.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A non-volatile memory allocation system for storing critical data in a gaming machine comprising:
   a non-volatile memory having memory space configurable to store critical data for a plurality of types of wagering games played on the gaming machine wherein the critical data comprises 1) current state information including credit information generated during a play of one of the plurality of types of wagering games, said current state information describing a current state of the gaming machine during the play in a manner that allows the gaming machine to be restored to the current state when a power interruption occurs between the current state and a following state in the play; and 2) previous state information including credit information associated with a previous play of one of the plurality of types of wagering games;
   a non-volatile memory manager configured to allocate and deallocate memory space in the non-volatile memory for first critical data associated with a first wagering game in the plurality of types of wagering games without altering or modifying existing second critical data stored in the non-volatile memory associated with a second wagering game in the plurality of types of wagering games wherein the deallocation comprises identifying the first critical data associated with the first game and identifying the memory space of the first critical data in the non-volatile memory and wherein the memory manager is configured to allocate and deallocate the memory space while the gaming machine is operable for game play.

2. The system of claim 1, further comprising a data file system for accessing and organizing the critical data stored in the non-volatile memory.

3. The system of claim 1, wherein the non-volatile memory comprises memory with a battery back-up.

4. The system of claim 1, wherein the non-volatile memory manager comprises machine readable code.

5. The system of claim 1, wherein the critical data is identified by files using a file system.

6. The system of claim 5, further comprising an application tool for accessing files in the file system.

7. The system of claim 1, wherein the non-volatile memory manager is further configured to allocate and dellocate memory space in the non-volatile memory associated with the second critical data.

8. The system of claim 1, wherein the non-volatile memory manager is further configured to delete the first critical data or the second critical data from the non-volatile memory.

9. The system of claim 1, wherein machine readable code associated with the first wagering game or the second wagering game is downloaded to the gaming machine from a remote gaming device in communication with the gaming machine via a network.

10. The system of claim 9, wherein the remote gaiming device is a game server.

11. The system of claim 1, wherein machine readable code associated with the first wagering game or the second wagering game is downloaded to the gaming machine from a memory device connected to the gaming machine.

12. A method of installing a game on a gaming machine comprising:
generating first critical data associated with execution of first game code for a first wagering game installed on the gaming machine allocating memory space in the non-volatile memory for the first critical data utilizing a non-volatile memory system;
writing the first critical data into the non-volatile memory wherein the first critical data comprises 1) current state information including credit information generated when the first wagering game is played, said current state information describing a current state of the gaming machine in a manner that allows the gaming machine to be restored to the current state when a power interruption occurs between the current state and a following state in a play of the first wagerinh game; and 2) previous state information including credit information associated with a previous play of the first wagering game;
receiving second game code, the second game code associated with a second wagering game to be installed on the gaming machine;
storing the second game code to a memory device on the gaming machine;
generating second critical data associated with the second game code;
allocating memory space in the non-volatile memory for the second critical data utilizing the non-volatile memory allocation system;
writing the second critical data into the non-volatile memory wherein the second critical data comprises 1) current state information including credit information generated when the second wagering game played, said current state information describing a current state of the gaming machine in a manner that allows the gaming machine to be restored to the current state when a power interruption occurs between the current state and a following state in a play of the second wagering game; and 2) previous state information including credit information associated with a previous play of the second wagering game, wherein the non-volatile memory includes the first critical data; and wherein the first critical data remains intact alter installing the second game code.

13. The method of claim 12, further comprising verifying the accuracy of the first critical data or to second critical data in the non-volatile memory.

14. The method of claim 12, wherein allocation further comprises verifying that adequate memory space exists in the non-volatile memory.

15. The method of claim 12, further comprising compacting the non-volatile memory to generate additional memory space.

16. The method of claim 12, wherein the first game code or the second game code is downloaded from a remote gaming device.

17. The method of claim 16, wherein the remote gaming device is a game server in communication with the gaming machine via a network.

18. The method of claim 12, further comprising: displaying a list of games available on the gaming machine, said list including the second wagering game and in response to receiving a selection of the second wagering game, downloading the second game code from a remote gaming device.

19. The method of claim 12, further comprising: deleting a portion of the first critical data or a portion of the second critical data.

20. A method of removing a first wagering game from a gaming machine comprising:
storing second critical data associated with a second wagering game to a non-volatile memory wherein the second wagering game is generated using second game code wherein the second critical data comprises 1) current state information including credit information generated when the second wagering game is played, said current state information describing a current state of the gaming machine in a manner that allows the gaming machine to be restored to the current state when a power interruption occurs between the current state and a following state in a play of the second wagering game; and 2) previous state information including credit information associated with a previous play of the second wagering game;
identifying a portion of first critical data associated with the first wagering game that is no longer needed wherein the first wagering game is generated using first game code wherein the first critical data comprises 1) current state information including credit information generated when the first wagering game is played, said current state information describing a current state of the gaming machine in a manner that allows the gaming machine to be restored to the current state when a power interruption occurs between the current state and a following state in a play of the first wagering game;

and 2) previous state information including credit information associated with a previous play of the first wagering game;

identifying a memory space of the portion of the first critical data that is no longer needed in the non-volatile memory through use of a non-volatile memory manager;

deleting the portion of the first critical data associated with the first wagering game, wherein deleting does not interfere with use of the second critical data also stored in the non-volatile memory; and deallocating the memory space previously occupied by the first critical data.

21. The method of claim 20, further comprising resizing remaining memory space resulting from the deletion of the first critical data.

22. The method of claim 20, further comprising verifying the accuracy of the second critical data in the non-volatile memory after removal of the first critical data.

23. The method of claim 20, wherein the non-volatile memory manager comprises machine readable code.

24. The method of claim 20, wherein the deallocating is performed by the memory manager.

25. The method of claim 20, further comprising: downloading machine readable code for the first wagering game from a remote gaming device.

26. The method of claim 25, wherein the remote gaming device is a game server.

27. The method of claim 20, further comprising: deleting a portion at the second critical data.

28. A gaming machine comprising:
a master gaming controller adapted to control a wagering game played on the gaming machine;
a display for displaying an outcome to the wagering game played on the gaming machine;
a non-volatile memory allocation system comprising;
  a non-volatile memory having memory space configurable to store critical data for a plurality of types of wagering games played on the gaming machine under control of the master gaming controller wherein the critical data comprises 1) current state information including credit information generated during a play of one of the plurality of types of wagering games, said current state information describing a current state of the gaming machine during the play in a manner that allows the gaming machine to be restored to the current state when a power interruption occurs between the current state and a following state in the play; and 2) previous state information including credit information associated with a previous play of one of the plurality of types of wagering games;
  a non-volatile memory manager configured to allocate and deallocate memory space in the non-volatile memory for first critical data associated with a first wagering game in the plurality of types of wagering games without altering or modifying existing second critical data stored in the non-volatile memory associated with a second wagering game in the plurality of types of wagering games wherein the deallocation comprises identifying the first critical data associated with the first wagering game and identifying the memory space of the first critical data in the non-volatile memory and wherein the memory manager is configured to allocate and deallocate the memory since while the gaming machine is operable for gaming play.

* * * * *